United States Patent [19]

Vagliani et al.

[11] 4,057,690

[45] Nov. 8, 1977

[54] METHOD AND APPARATUS FOR DETECTING THE PRESENCE OF A SPEECH SIGNAL ON A VOICE CHANNEL SIGNAL

[75] Inventors: Federico Vagliani, Milan; Alcide Molinari, Vimercate, both of Italy

[73] Assignee: Telettra Laboratori di Telefonia Elettronica e Radio S.p.A., Milan, Italy

[21] Appl. No.: 699,364

[22] Filed: June 24, 1976

[30] Foreign Application Priority Data

July 3, 1975 Italy .................................. 25053/75

[51] Int. Cl.² .............................................. G10L 1/04
[52] U.S. Cl. .............................................. 179/15 AS
[58] Field of Search ........................ 179/15 AS, 1 VC

[56] References Cited

U.S. PATENT DOCUMENTS

| 3,046,347 | 7/1962 | Miedema | 179/15 AS |
| 3,712,959 | 1/1973 | Fariello | 179/1 VC |
| 3,878,337 | 4/1975 | Fariello | 179/1 VC |

Primary Examiner—Kathleen H. Claffy
Assistant Examiner—Kenneth A. Chayt
Attorney, Agent, or Firm—Hubbell, Cohen, Stiefel, & Gross

[57] ABSTRACT

A system and method for detecting the presence of useful speech information in telephone voice channels capable of containing noise as well as such useful speech information for optimizing the telephone transmission of such speech information. Two segments of the envelope of a given voice channel are compared against each other over two different time domains in order to determine if a predetermined magnitude of difference exists between these envelopes. The presence of such magnitude of difference is indicative of the presence of such useful speech information in the voice channel thereby enabling transmission thereof by the system, whereas the absence of such magnitude of difference is indicative of the presence of solely noise thereby preventing the transmission thereof by the system.

34 Claims, 10 Drawing Figures

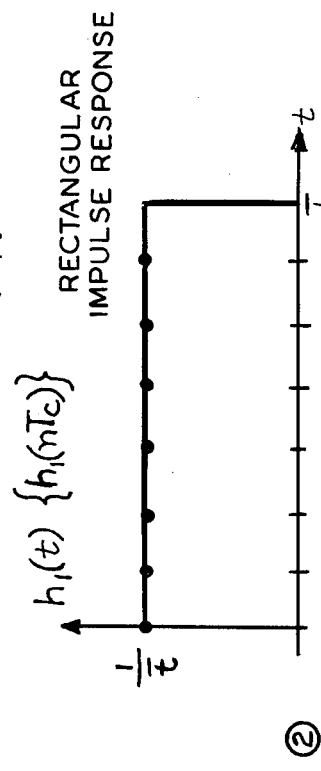
FIG. 4a.
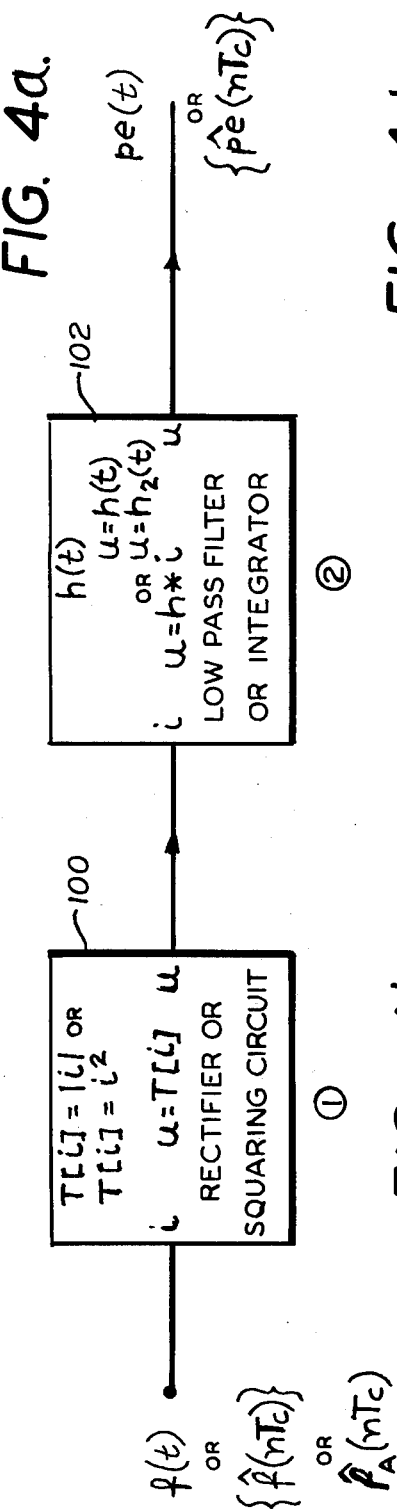
FIG. 4b. RECTIFIER
FIG. 4c. SQUARING CIRCUIT
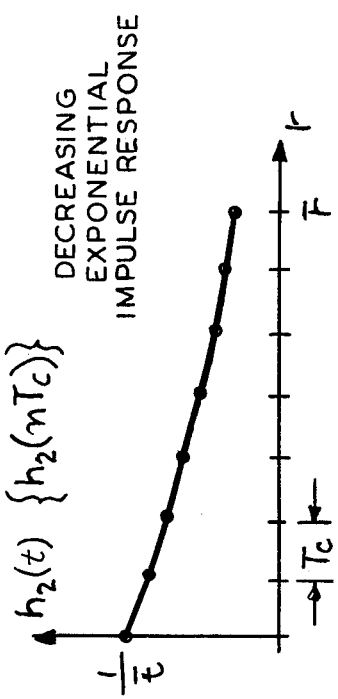
FIG. 4d. RECTANGULAR IMPULSE RESPONSE
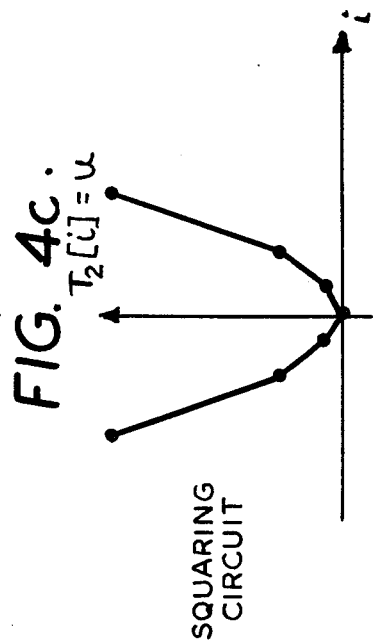
FIG. 4e. DECREASING EXPONENTIAL IMPULSE RESPONSE

METHOD AND APPARATUS FOR DETECTING THE PRESENCE OF A SPEECH SIGNAL ON A VOICE CHANNEL SIGNAL

CROSS-REFERENCE TO RELATED APPLICATIONS

This application is related our copending U.S. Pat. application Ser. No. 580,914, filed May 27, 1975, now U.S. Pat. No. 4,005,274, issued Jan. 25, 1977, and entitled "Pulse-Code Modulation Communication System", the contents of which are hereby specifically incorporated by reference herein in its entirety.

BACKGROUND OF THE INVENTION

1. Field of the Invention

This invention relates to communications systems employing speech detectors; more particularly, this invention relates to a system for increasing speech detection accuracy by suitably evaluating the variations with time of the envelope associated with a given voice channel signal.

2. Description of the prior art

The problem of increasing the traffic capacity of telephone lines or links in telephone communication systems has been continually increasing due to increases in both demand and cost of such transmission. There have been several prior art attempts to optimize such telephone transmission, such as by what has been commonly termed speech interpolation. However, such speech interpolation systems depend, for maximum efficiency, on correctly deciding whether or not, at a given instant, a speech signal is present in a given telephone voice channel signal. Furthermore, the quality or reliability of such telephonic transmission is directly dependent on the correct detection of the presence or absence of the speech signal in all of the telephone voice channels associated with a single such speech interpolation system. Such speech detection, however, is made both difficult and costly by the presence of background noise, having nothing to do with the speech signal, on each of the associated telephone voice channels, such noise normally being present in telephonic transmissions. In order to compensate for the presence of such noise, prior art speech detection systems operate by evaluating the envelope of a given telephone voice channel signal and then comparing this evaluation with a preset constant threshold level which is preset at a value higher than the noise level normally found in such voice channel signals. Therefore, if the envelope, also known as the short-time-power, exceeds this threshold level, such prior art systems presume that useful speech information is present and the channel thereby assumes an active state (active channel) in which the voice channel signal will be transmitted. However, if the evaluated envelope is less than this preset threshold level, such prior art systems presume that only noise is present in which case the channel thereby assumes an idle state (idle channel) in which the voice channel signal is not transmitted. Thus, these prior art systems associate the presence of speech with a relatively high power threshold and vice versa. Such prior art speech detection is not satisfactory, however, since the speech envelope may at various times be less than the preset threshold level in which instance the system would not transmit information which should have been transmitted, thereby diminishing the quality and reliability of such prior art systems.

These disadvantages of the prior art are overcome by the present invention.

SUMMARY OF THE INVENTION

A speech detection system is provided in which the presence of useful speech information in telephone voice channels, capable of containing noise as well as such useful speech information for optimizing the telephone transmission of such speech information, is detected dependent on a comparison of various segments of the envelope of a given voice channel over different time domains. Such a speech signal has particular associated characteristics in that it may be considered as an amplitude modulated wave consisting of a carrier frequency and the modulating signal or envelope. The envelope, or short-time-power, of the speech signal is more band limited (for example, 0 Hz–100 Hz) than the carrier (for example, 300 Hz - 3400 Hz) and is also characterized by the fact that it normally varies over time. In contrast, the background noise normally present in all telephone voice channel signals is characterized by the fact that its envelope or short-time-power is substantially constant over time. The preferred system and method in accordance with the present invention utilizes this difference between the envelope or short-time-power of the speech signal as compared with that of the background noise in a given telephone voice channel signal to detect the presence of speech.

The preferred embodiment of the invention for detecting the presence of speech on a given telephone voice channel involves evaluating the short-time-power or envelope of the voice channel signal and initially comparing the magnitude of this value with two different threshold levels. The first threshold level is preset at a level above the envelope or short-time-power of the background noise normally present in the telephone voice channel signal, and consequently if the voice channel signal exceeds this preset level, the system will presume that speech is present. In such a case, the voice channel will then assume an active state and the voice channel signal will be transmitted. In this regard, the preferred system is similar to prior art systems. The second threshold level is preset at a value lower than the first, and is characterized in that the envelope or short-time-power of the speech signal is normally greater than this second threshold level. Therefore, if this second threshold level exceeds the envelope or short-time-power of the voice channel signal, the system will presume that only noise, or the absence of useful speech, is present and the voice channel will assume an idle state in which that particular voice channel signal will not be transmitted. In the preferred system of the present invention, in the instance when the envelope or short-time-power of the voice channel signal falls between the aforementioned two threshold levels, the preferred system will compare the short-time-power or envelope of the channel signal as evaluated over one portion of the time domain (signal "a") with the short-time-power or envelope of the channel signal as evaluated over a different portion of the time domain (signal "b"). If the difference between these signals "a" and "b" is greater than a predetermined magnitude, the preferred system will then assume the presence of speech in that voice channel signal. Such variation could not be due to noise alone since, as noted above, the short-time-power or envelope of such background noise is substantially constant over time. Thus, in those situations where the short-time-power or envelope of the voice channel signal does not exceed the first threshold level, the system of the present invention, unlike prior art system, has the capability of detecting the presence of speech.

BRIEF DESCRIPTION OF THE DRAWINGS

FIG. 1a illustrates the response of the squaring circuit of the prior art speech detector;

FIG. 1b illustrates the response of the low-pass filter/integrator of the prior art speech detector;

FIG. 4a illustrates a short-time-power estimator;

FIGS. 4b and 4c show alternative responses for the first block of FIG. 4a; and

FIGS. 4d and 4e show alternative responses for the second block of FIG. 4a.

DETAILED DESCRIPTION OF THE PREFERRED EMBODIMENTS

Figure 2:
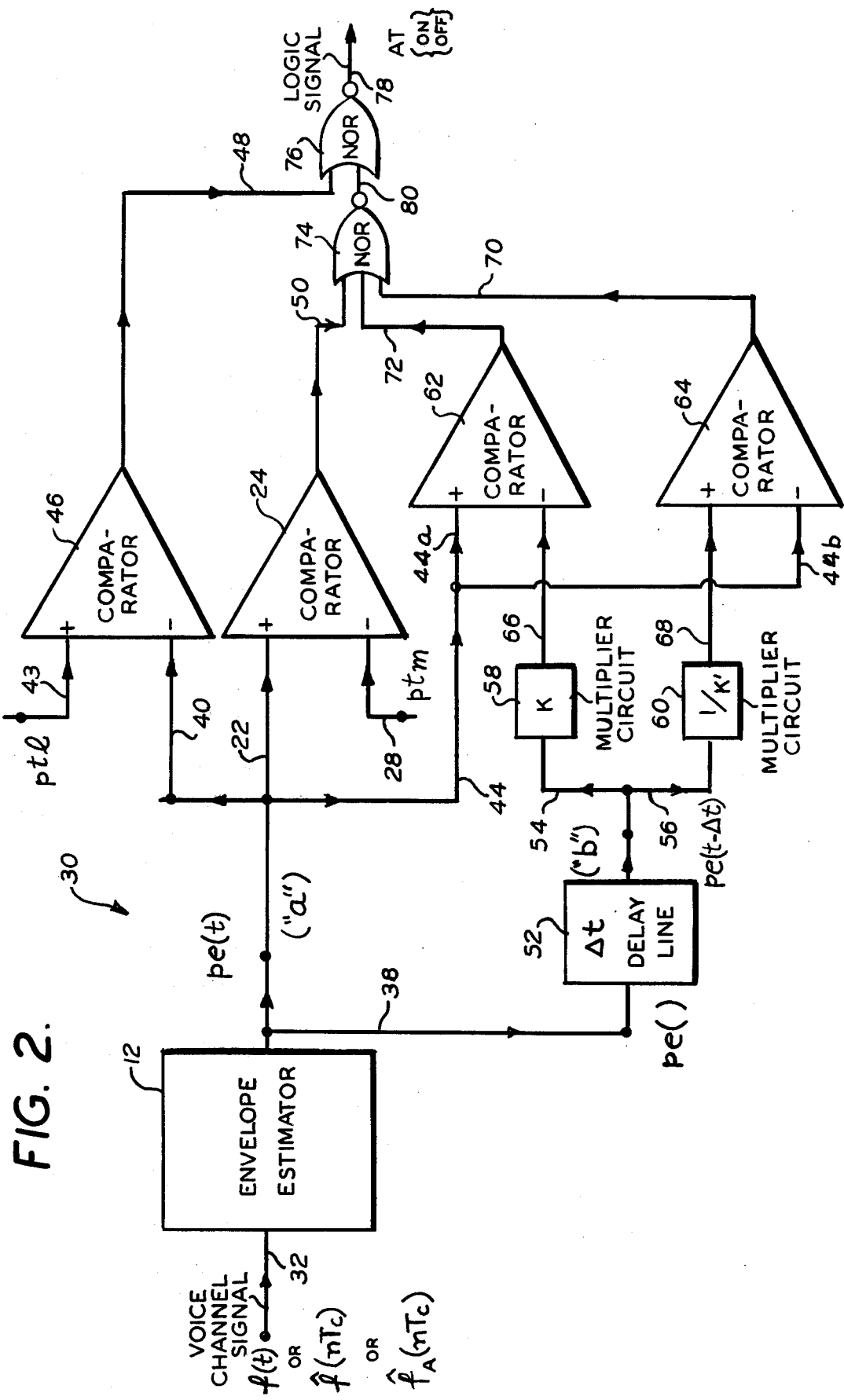
FIG. 2 shows one embodiment of the invention.

Referring now to the drawings in detail and initially to FIG. 2 thereof, FIG. 2 is a block diagram of a preferred speech detection system in accordance with the present invention, generally referred to by the reference numeral 30. As shown and preferred in FIG. 2, the input via path 32 to the system 30 is a conventional telephone voice channel signal $f(t)$ which normally contains both useful speech information and background noise. This input signal $f(t)$, as will be described in greater detail hereinafter, is analyzed by the system 30 for the presence of speech. As will be further described hereinafter, the final output from system 30 is a conventional logic signal (AT) having two binary states termed "ON" and "OFF" in system 30, with the "ON" state corresponding to the presence of speech in the voice channel signal, thereby providing an active channel in which the voice channel signal is transmitted and with the "OFF" state corresponding to the absence of speech (or presence of only noise) in the voice channel signal, thereby providing an idle channel in which the voice channel signal is not transmitted.

The voice channel signal $f(t)$, which is to be analyzed by the system 30 for the presence of speech, may be either a base band analog signal $f(t)$, which is the form of the voice channel signal as normally provided from a subscriber's telephone, or a digital signal obtained by sampling this analog signal $f(t)$ every $T_c$ seconds and then quantizing these samples either linearly, in which case the signal $f(nT_c)$ having equal quantum steps is obtained, or with an appropriate conventional companding law, generally logarithmic (type A or $\mu$), in which case the signal $f_A(nT_c)$ having unequal quantum steps is obtained, and finally by encoding the quantized samples with $b_s$ bits per sample (for example, using $b_s =$ 8) so as to arrive at a conventional pulse-code-modulated (PCM) digital signal.

Figure 1:
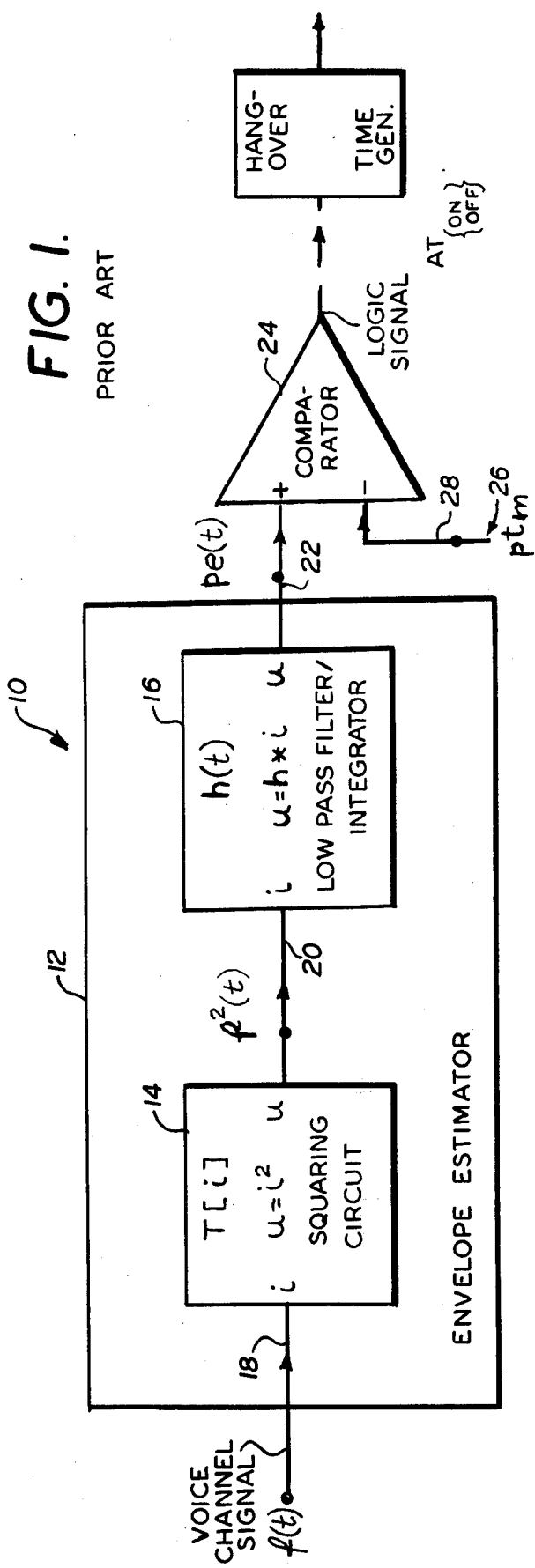
FIG. 1 shows a typical prior art speech detector.

The main function of all speech detection systems, including the present invention, is to detect the presence of useful speech information in telephone voice channels capable of containing noise as well as such useful speech information. The most popular prior art speech detection systems currently available are those used, for example, in time assignment speech interpolation (TASI) systems, an example of which is T.A.S.I. A or B. A block diagram of such a prior art speech detector is shown in FIG. 1 and is generally designated by the reference numeral 10. As previously mentioned, prior art speech detectors analyze the voice channel signal for the presence of speech information by performing two basic functions: (1) evaluating the envelope or short-time-power of a given voice channel signal and (2) comparing the magnitude of that value with a preset constant threshold level, which is preset at a value higher than the noise level normally present in such voice channel signals.

In order to facilitate an understanding of the present invention, such a prior art speech detection system shall be described herein with reference to FIG. 1. As shown in FIG. 1, the envelope or short-time-power $pe(t)$ of the voice channel signal is evaluated by an envelope or short-time-power estimator 12 (STPE) which preferably consists of two conventional cascaded blocks; namely a conventional squaring circuit 14 (SE) such as a balanced modulator and a conventional low pass filter or integrator 16 such as an R.C. filter. The input voice channel signal $f(t)$ in such a prior art system 10 is applied through a line 18 to the squaring circuit 14 whose conventional transfer function T[i], shown in FIG. 1a, is such that the output $u$ is equal to the square of the input $i$, that is, $u = i^2$. Thus, with an input to the squaring circuit of the voice channel signal $f(t)$, the output will be $[f(t)]^2$. This signal [i $f(t)$]² is then applied through a line 20 to the low pass filter or integrator 16 whose impulse response is $h(t)$. A graphical representation of this signal $h(t)$ is shown in FIG. 1b where E represents the time constant of the low pass filter or integrator 16. The resultant value or evaluation of the envelope or short-time-power $pe(t)$ of the voice channel signal $f(t)$ thus obtained at the output of the envelope or short-time-power estimator 12 is then applied through a line 22 to a conventional comparator circuit (PC) 24 where it is compared with a preset threshold level ptm 26 which is preferably preset at a value higher than the envelope or short-time-power of the noise normally found in such voice channel signals, the threshold $ptm$ preferably being applied to the comparator 24 via a line 28. In such an instance, if the magnitude of the envelope of the voice channel signal exceeds the preset threshold level ptm as determined by the power comparator 24, the prior art system 10 of FIG. 1 will presume that speech information is present, the channel thereby assuming an active state in which the voice channel signal will be transmitted, whereas if the threshold level ptm exceeds the magnitude of the envelope of the voice channel signal, the system 10 will presume that no speech information is present (or that noise only is present) in which case the channel will thereby assume an idle state. The final output of the prior art speech detection system 10 is a conventional logic signal (AT) having two binary states termed "ON" and "OFF" with "ON" corresponding to an active state (active channel) and "OFF" corresponding to an idle state (idle chanel). By way of example, the threshold power ptm may be preset at approximately −40 dBmO (this value is derived from an International Telegraph and Telephone Consultative Committee (C.C.I.T.T.) recommendation which specifices such limit for the noise on telephone lines) and the time constant $\bar{t}$ of the low pass filter or integrator 16 may vary between approximately 5 and 50 msec.

As previously mentioned, the basic disadvantage of such prior art speech detectors 10 such as shown in FIG. 1, is that these prior art systems associate the presence of speech in a given voice channel signal with a relatively high power threshold and vice versa.

Now that a typical prior art speech detector 10 has been described with reference to FIG. 1, the preferred system 30 of the present invention shall be described. However, before doing this, some additional background information shall be provided herein. It is well known that articulated sound is produced by means of a two-fold excitation mechanism of the human vocal tract. The first such excitation mechanism which is responsible for "voiced" or vocalized sounds consists of substantially periodic air impulses resulting from vibration of the vocal chords. The second such excitation mechanism is responsible for "unvoiced" or nonvocalized sounds and consists of noise sources which are created from the air turbulence resulting from the narrowing of the vocal tract itself. Thus, the speech signal is substantially periodic during such "voiced" segments and is characterized by a high short-time-power or envelope white, on the other hand, during such "unvoiced" segments, the speech signal is not at all periodic and is characterized by a small short-time-power or envelope such as 15 to 20 dB less than the power present in the aforementioned "voiced" segments, it thus being apparent that the envelope or short-time-power of the composite speech signal will normally vary over time. Moreover, while the complete speech signal depends on fast phenomena such as the vibration of vocal cords and air turbulence in the vocal tract, the envelope depends on much slower phenomena such as the state of the vocal tract (i.e., relative position of the various organs), the intensity of the stimuli on the vocal cords, and the beginning and ending of the stimuli themselves. Thus, as a preliminary approximation the speech signal can be considered as the product of two random processes, namely the "envelope" and the "carrier". The "carrier" has a spectrum which is between approximately 300 Hz and 3400 Hz, (the speech band) while the "envelope", which is also commonly referred to as the aforementioned "short-time-power", is much slower, such as, for example, between 0 Hz and 100 Hz, the envelope being further characterized by the fact that it normally varies over time. Accordingly, prior art speech detection systems, such as system 10 shown in FIG. 1, by comparing the envelope or short-time-power of the voice channel signal with a single preset constant threshold level (shown as ptm in FIG. 1), as previously mentioned, fail to detect the presence of speech in a given voice channel signal when the short-time-power or envelope of the speech signal contained in the voice channel signal drops below that threshold level, as may occur, for example, during unvoiced segments.

The preferred speech detection system 30 of the present invention is based on the phenomenon that while the envelope or short-time-power $pe(t)$ of the speech signal normally varies over time, the envelope or short-time-power of the background noise normally present in such voice channel signals is substantially constant over time, this phenomenon being utilized to implement the preferred speech detection system 30 which will detect the presence or absence of speech with greater accuracy than prior art speech detection system, such as the type shown, for example, in FIG. 1.

Specifically, and as is more fully explained below, the preferred system 30 in accordance with the present invention compares the magnitude of the envelope or short-time-power of the voice channel signal as evaluated over one time domain (signal "a") with the magnitude of the envelope or short-time-power of the voice channel signal as evaluated over a different time domain (signal "b"), and then, depending on the magnitude of the difference between these two signals (for example, signals "a" and "b") the output of the system, the logic signal AT, then assumes either on "ON" (active channel) or an "OFF" (idle channel) state, as was explained above.

Returning now to FIG. 2, a block diagram of the preferred speech detection system 30 in accordance with the present invention is shown. The voice channel signal $f(t)$ which is to be analyzed for the presence of speech is applied via line 32 to the conventional envelope or short-time-power estimator 12 which is preferably identical to that described above with reference to the prior art speech detection system 10 of FIG. 1. The output of the envelope estimator 12 is the envelope or short-time-power $pe(t)$ (signal "a") of the voice channel signal f(t) as evaluated at time $t$. Signal "a" is then applied via line 38 to a conventional delay line 52, such as LC delay line or 2833 shift register (such as maufactured by Advanced Micro Devices Corp.). The delay line 52 imparts a predetermined time delay of $\Delta t$ duration, such as 10 to 100 MB to the signal "a" and, thus, yields at its output the envelope or short-time-power $pe(t-\Delta t)$ (signal "b") of the voice channel signal $f(t)$ as evaluated at time $t-\Delta t$. Signal "b" is then preferably applied through lines 54 and 56, respectively, to conventional multiplier circuits 58 and 60, such as balanced multiplier or LO25 (such as manufactured by SGS Ates, S.p.A., Italy) digital multiplier (such as manufactured by Advanced Micro Devices Corp.), which conventionally multiply signal "b" $[pe(t-\Delta t)]$ by the constants K and 1/K', respectively, with K and K' being greater than unity and not necessarily equal. These multiplied signals $[(K) (pe(t-\Delta t)]$ and $[(1/K') [pe(t-\Delta t)]$ at the outputs of the multipliers 58 and 60 are then preferably applied through lines 66 and 68, respectively, to a pair of conventional comparators 62 and 64, such as integrated comparators $\mu A$ 710 (such as manufactured by Fairchild), which conventionally compare these multiplied signals with the signal "a" $[pe(t)]$ which is applied to the comparators 62 and 64 via lines 44a and 44b, respectively. Signal "a" is also preferably applied, in parallel, directly to the input of a second pair of conventional comparators 46 and 24, such as integrated comparators $\mu A$ 710 (such as manufactured by Fairchild), through lines 40 and 22, respectively, which conventionally compare signal "a" with preset threshold signal levels ptl (line 43) and ptm (line 28), respectively, which levels are preferably different and satisfy the condition that $ptm > ptl$.

The outputs of comparators 62 via line 72, 64 via line 70 and 24 via line 50 are then preferably applied to the input of a conventional NOR gate 74, such as integrated NOR gate 7402 (such as manufactured by Texas Instruments). The output of NOR gate 74, via line 80, is then preferably applied, together with the output of comparator 46, via line 48, to the input of a second conventional NOR gate 76, such as integrated NOR gate 7402 (such as manufactured by Texas Instruments). The aforementioned output logic signal AT of the preferred speech detecting system 30 is then provided at the output of NOR gate 76 via line 78 in order to then conventionally turn the channel "ON" (active) or "OFF" (idle), as previously mentioned.

By way of example, typical preferred values of the above parameters are as follows: $ptm = -30$ to $-40$ dBmO; $ptl = -40$ to $-50$ dBmO; $\Delta t = 10$ to 100 msec; $K = 1.5$ to 8; and $K' = 1.5$ to 8.

The operation of the preferred speech detection system 30 of FIG. 2 of the present invention is as follows. After the envelope or short-time-power $pe(t)$ (signal "a") of the voice channel signal $f(t)$ is evaluated by the envelope or short-time-power estimator 12, it is compared by the comparator circuit 24 with the threshold level ptm, ptm preferably being preset at a value higher than the envelope or short-time-power of the background noise normally present in voice channel signals. This aspect of the speech detection system 30 is similar to the aforementioned operation performed by prior art speech detector 10, as was described above with reference to FIG. 1. Thus, if the envelope or short-time-power $[pe(t)]$ of the voice channel signal $[f(t)]$ exceeds the preset threshold level ptm, the channel will assume an active state condition via NOR gates 74 and 76, with logic signal AT therefore being "ON" (active). The envelope or short-time-power $pe(t)$ of the voice channel signal $f(t)$ is further compared by comparator circuit 46 with the second preset threshold level ptl, ptl preferably being preset at a value lower than the envelope or short-time-power of the speech signal contained in the voice channel signal $f(t)$. Thus, if the envelope or short-time-power of the voice channel signal is less than the second preset threshold level ptl, as determined by comparator circuit 46, the system will preferably presume that no speech is present in the voice channel signal (or that noise only is present) and the channel will assume, via NOR gates 74 and 76, an idle state, with the logic signal AT therefore being "OFF" (idle).

The delayed envelope or short-time-power signal $pe(t-\Delta t)$ (signal "b") of the voice channel signal f(t) is preferably multiplied by the constants K and $1/K'$ by multiplier circuits 58 and 60, respectively, and these products are compared with the envelope or short-time-power $pe(t)$ (signal "a") of the voice channel signal $f(t)$ as evaluated at time $t$ by the comparator circuits 62 and 64, respectively. It should be noted that the system logic (NOR gates 74 and 76) preferably is so arranged that the comparison of signals "a" and "b" will be determinative of the channel state (AT) only if the envelope or short-time-power of the voice channel signal lies between the two threshold levels ptl and ptm as defined by the expression $ptl<pe(t)<ptm$. Since, as is more fully described above, if $pe(t)<ptm$ or if $pe(t)<ptl$, the presence or absence of speech will have previously been detected by the system 30. Thus, assuming $ptl<pe(t)<ptm$, the system logic will define the channel state (AT) as follows: if $pe(t)<K[pe(t-\Delta t)]$ or if $pe(t)<(1/K')[pe(t-\Delta t)]$, the channel will preferably assume an active state (i.e., logic signal AT will be "ON"), and if $pe(t-)<K[pe(t-\Delta t)]$ or $pe(t)>(1/K')[pe(t-\Delta t)$, the channel will preferably assume an idle state (i.e., logic signal AT will be "OFF"). It is noted that, depending on the selection of the constants K and K', any magnitude of variation between the signals "a" and "b" may be detected. However, the constants K and K' should not be too close to unity, preferably at least 1.5, since small variations in the envelope or short-time-power of the voice channel signal may be due to variations in the short-time-power or envelope of the noise. This is so since, although the envelope of the noise is substantially stable over time, it is not normally in reality an absolute constant, and minor variations in the envelope of the noise do normally occur.

Thus, the preferred system 30 first evaluates the short-time-power on the voice channel signal over two different time domains and then compares the magnitudes of these two evaluations. Then, if the envelope or short-time-power of the voice channel signal has either increased by more than a factor of $1/K'$ or decreased by more than a factor of K, the system logic will make a logic decision that a speech signal is present in the voice channel signal since such variations in the magnitude of the envelope or short-time-power of the voice channel signal can only be due to the presence of a speech signal since, as explained above, the short-time-power of the background noise is substantially constant over time.

Figure 3:
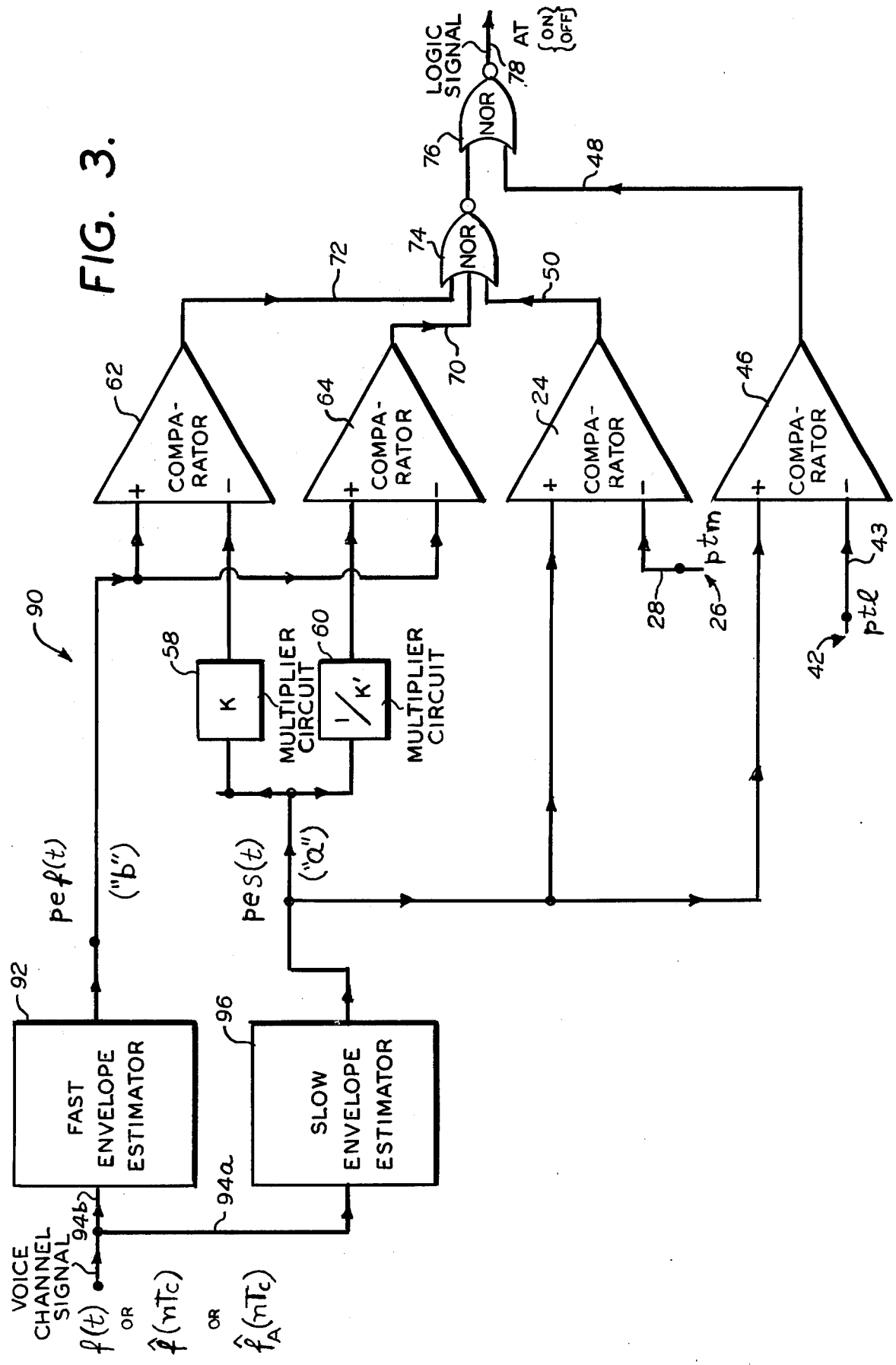
FIG. 3 shows another embodiment of the invention.

Referring now to FIG. 3, an alternative embodiment of the speech detection system according to the present invention is generally designated by the reference numeral 90. Speech detection system 90 is preferably identical to the speech detection system 30 shown in FIG. 2 and described with respect thereto in all respects except the following: signal "a" is generated by applying the voice channel signal via line 94b to a "fast" envelope or short-time-power estimator 92, such as FIG. 1 STPE, which integrates f(t) over relatively short times, such as 1 to 10 mb, while signal "b" is generated by applying the voice channel signal via line 94a to a "slow" envelope or short-time-power estimator 96, such as FIG. 1 STPE, which integrates $f(t)$ over relatively long times, as as 10 to 100 ms, the output of estimator 92 being $pef(t)$ and the output of estimator 96 being $pes(t)$. These signals are preferably readily obtained from envelope or short-time-power estimators 92 and 96, which are preferably identical in function to estimator 12 shown in FIG. 1, by selecting different time constants for each of the low pass filters 16 therein, such as 2ms and 8 ms.

Preferably, and as shown in FIG. 3, pes(t), which is a more arcuate representation of the envelope or short-time-power channel signal (since it is integrated over a longer time period), is compared with the preset threshold levels ptl and ptm at comparators 46 and 24, respectively, to initially determine if the channel will assume an active state or an idle state, as is more fully described above with reference to the speech detection system 30 shown in FIG. 2.

The estimator 96 output signal $pes(t)$ signal "a") is also multiplied by K and $1/K'$ in multipliers 58 and 60, respectively, and the products compared with $pef(t)$ (signal "b") at comparators 62 and 64 to determine (in the event that $ptl<pe(t)<ptm$) if there has been a sufficient variation in the magnitude of the envelope or short-time-power of the channel signal $f(t)$ over time to warrant a determination that speech is present in the voice channel signal, as is more fully described above with reference to the speech detection system 30 shown in FIG. 2. That is, if $pef(t)>K[pes(t)]$ or if $pef(t)<(1/K)[pes(t)]$, the channel will preferably assume an active state (i.e., logic signal AT will be "ON" and if $pef(t-)<K[pes(t)]$ or if $pef(t)> (1/K'[pes(t)]$, the channel will preferably assume an idle state (i.e., logic signal AT will be "OFF").

By way of example, typical values of the above parameters according to the speech detection system 30 are as follows: $ptm = -30$ to $-40$ dBmO; $ptl = -50$ to $-60$ dBmO; $K = 1.5$ to 8; and $K' = 1.5$ to 8.

It will be obvious to anyone skilled in the art that certain portions of the preferred embodiments of the speech detection system of the present invention have been deleted from the description and the drawings for purposes of clarity and do not in any way affect the understanding of the invention herein.

Particularly, the actual construction of the devices necessary to implement the invention are not shown, but are clearly readily constructable by any skilled in the art from conventional circuitry. Similarly, the operation of the comparator circuits and the logic gates (NOR gates 74 and 76) have been omitted from the description, these being conventional. Moreover, unless otherwise described herein, the various component circuits comprising the system of the present invention, including FIGS. 4a–4e, are conventional.

As concerns the envelope or short-time-power estimators shown in FIGS. 1 through 3, it is noted that they are conventionally implemented in substantially different ways according to whether they are to treat analog voice channel signals of type $f(t)$ or digitalized voice channel signals of type $\hat{f}(nT_c)$ and/or $\hat{f}_A(nT_c)$. FIG. 4a shows a block diagram for such an estimator in which the voice channel signal being processed may be either analog or digital.

Block 100 may either be a conventional rectifier, such as a diode, so that the output will represent the absolute value of the input, that is, $u = |i|$ as shown in FIG. 4b, or a conventional squaring circuit, such as balanced modulator LO25 (such as manufactured by SGS Ates S.p.A., Italy) so that the output will represent the square of the input, that is, $u = i^2$, as shown in FIG. 4c. Block 102 is, in either case, a conventional low pass filter or integrator having an impulse response either of the rectangular type $h_1(t)$ shown in FIG. 4d or of the decreasing exponential type $h_2(t)$ shown in FIG. 4e.

The block diagram of FIG. 4a is also valid when digital voice channel signals $\hat{f}(nTc)$ or $\hat{f}_A(nTc)$ are processed. In this case, however, the envelope or short-time-power $\hat{pe}(nTc)$ will also be digital and the impulse responses $h_1(nTc)$ and $h_2(nTc)$ of the low pass filter or integrator 102 must be considered as sampled. The comparator circuits (FIGS. 1 through 3) will have analog or digital inputs according to whether voice channel signals $f(t)$ or $\hat{f}(nTc)$ or $\hat{f}_A(nTc)$ are processed. Similarly, K and 1/K' will be analog or digital multipliers. In any case, the outputs from the comparator circuits will be logic signals which are capable of assuming only one of two possible logic states, high or low.

Before making a direct comparison between the conventional speech detection system, such as that shown in FIG. 1, and the preferred speech detection system according to the present invention, those parameters which are a measure of the behavior of speech detection systems generally will be defined herein for clarity. The "noise immunity" of a speech detection system is equal to X dBmO if, when noise along is present on the voice channel signal, the logic output AT of the speech detector does not switch to the "ON" state until a noise power of X dBmO is reached. The higher the noise immunity, the better the speech detector. "Set time" refers to the time interval elapsing from the instant at which a speech signal is initiated on the voice channel signal and the instant at which the logic output AT of the speech detection system switches to "ON". The shorter the set time, the better the speech detector. "Reset time" refers to the time interval elapsing from the instant at which a speech signal is terminated on the voice channel signal and the instant at which the logic output AT of the speech detection system switches to "OFF". The shorter the reset time, the better the speech detector. "Quality" refers to the capability of a speech detection system of avoiding transmission "holes" (i.e., interruptions due to the logic signal AT switching to "OFF") during the presence of speech on the voice channel signal. Since the quality can only be evaluated subjectively, it is difficult to express its magnitude in numerical terms. However, this characteristic is extremely important since transmission interruptions in the middle of a word are unsatisfactory. The better the qualtiy, the better the speech detector.

Considering the above, the superior performance of a speech detection system in accordance with the present invention, as compared with conventional detectors, such as shown in FIG. 1, may be summarized as follows. At equal noise immunity levels, the speech detection system of the present invention feature shorter set times and reset times and much better quality, whereas at equal quality, the speech detection system of the present invention features shorter set times and reset times, and much higher noise immunity (for example, 10 dB to 15 dB).

It is to be understood that the above described embodiments of the invention are merely illustrative of the principle thereof and that numerous modifications and embodiments of the invention may be derived within the spirit and scope thereof.

What is claimed is:

1. In a method for detecting the presence of a speech signal in a voice channel signal, said method providing an active channel indication when said speech signal presence is detected in said voice channel signal and an idle channel indication when the absence of said speech signal presence is detected in said voice channel signal, said voice channel signal being capable of containing both said speech signal and background noise, said speech signal having an envelope associated therewith having a magnitude variable over time, said background noise having an evelope associated therewith having a magnitude substantially constant over time, said voice channel signal having an envelope associated therewith having a magnitude dependent on said magnitudes of said speech signal and said background noise envelopes; said method being of the type wherein a first evaluation of said voice channel signal envelope magnitude is made over a first time domain to obtain a first resultant output signal and compared with a first preset threshold level for providing a first active channel condition when said first evaluation resultant output signal exceeds said first preset level, said first level being preset at a level higher than said background noise envelope magnitude; the improvement comprising the steps of making a second evaluation of said voice channel signal envelope magnitude over a second time domain to obtain a second resultant output signal, said second time domain being different from said first time domain, determining the difference in magnitude between said first and second evaluation resultant output signals, and comparing said difference with at least a first predetermined value and providing a second active channel condition when said difference exceeds said first predetermined value and a first idle channel condition when said difference is less than said first predetermined value, said active channel indication being provided when either said first or second active channel conditions are present, said idle channel indication only being provided when said first idle channel condition is present and neither said first or second active channel condition is present.

2. An improved method in accordance with claim 1 wherein said first preset threshold level is a constant.

3. An improved method in accordance with claim 1 wherein said first preset threshold level is substantially preset at a level of between $-30$ dBmO and $-40$ dBmO.

4. An improved method in accordance with claim 1 further comprising the steps of comparing said first evaluation resultant output signal with a second preset threshold level, said second level being preset at a level less than said first level for providing a second idle channel condition when said first evaluation resultant output signal is less than said second level, said idle channel indication being provided when either said first or second idle channel conditions are present and neither said first nor second active channel conditions are present.

5. An improved method in accordance with claim 4 wherein said second preset threshold level is a constant.

6. An improved method in accordance with claim 4 wherein said second preset threshold level is substantially preset at a level of between $-40$ dBmO and $-50$ dBmO.

7. An improved method in accordance with claim 1 wherein the step of making said first evaluation comprises the step of integrating said voice channel signal over said first time domain, and the step of making said second evaluation comprises the step of integrating said voice channel signal over said second time domain.

8. An improved method in accordance with claim 1 further comprising the steps of making said first and second evaluations continuously over time for continuously detecting the presence or absence of said speech signal in said voice channel signal.

9. An improved method in accordance with claim 8 wherein the step of making said second evaluation comprises the step of delaying said first resultant output signal by a predetermined time period, said delayed first resultant output signal comprising said second resultant output signal, said second time domain comprising said first time domain delayed by said predetermined time period.

10. An improved method in accordance with claim 1 wherein the step of comparing said difference in magnitude between said first and second evaluation resultant output signals with at least a first predetermined value comprises the steps of multiplying said second evaluation resultant output signal by a first preset constant multiplying factor for obtaining a first product, said first multiplying factor having a value greater than unity, comparing said first product with said first evaluation resultant output signal, and providing said second active channel condition when said first evaluation resultant output signal exceeds said first product and said first idle channel condition when said first evaluation resultant output signal is less than said first product.

11. An improved method in accordance with claim 10 wherein said first preset constant multiplying factor is preset at about 1.5 to 8.

12. An improved method in accordance with claim 10 further comprising the steps of multiplying said second evaluation resultant output signal by a second preset constant multiplying factor for obtaining a second product, said second multiplying factor having a value less than unity, comparing said second product with said first evaluation resultant output signal, and providing said second active channel condition when either said first evaluation resultant output signal exceeds said first product or said first evaluation resultant output signal is less than said second product and said first idle channel condition when either said first evaluation resultant output signal is less than said first product or said first evaluation resultant output signal is greater than said second product.

13. An improved method in accordance with claim 12 wherein said second preset multiplying factor is preset at about 0.125 to 0.667.

14. A method for detecting the presence of a speech signal in a voice channel signal, said method providing an active channel indication when said speech signal presence is detected in said voice channel signal and an idle channel indication when the absence of said speech signal presence is detected in said voice channel signal, said voice channel signal being capable of containing both said speech signal and background noise, said speech signal having an envelope associated therewith having a magnitude variable over time, said background noise having an envelope associated therewith having a magnitude substantially constant over time, said voice channel signal having an envelope associated therewith having a magnitude dependent on said magnitudes of said speech signal and said background noise envelopes; said method comprising the steps of making a first evaluation of said voice channel signal envelope magnitude over a first time domain to obtain a first resultant output signal, making a second evaluation of said voice channel signal envelope magnitude over a second time domain to obtain a second resultant output signal, said second time domain being different from said first domain, determining the difference in magnitude between said first and second evaluation resultant output signals, comparing said difference with at least a first predetermined value and providing an active channel conditon when said difference exceeds said predetermined value and an idle channel condition when said difference is less than said predetermined value, said active channel indication being provided when said active channel condition is present, said idle channel indication being provided when said idle channel condition is present.

15. A method in accordance with claim 14 wherein the step of comparing said difference in magnitude between said first and second evaluation resultant output signals with at least a first predetermined value comprises the steps of multiplying said second evaluation resultant output signal by a first preset constant multiplying factor for obtaining a first product, said first multiplying factor having a value greater than unity, comparing said first product with said first evaluation resultant output signal, and providing said active channel condition when said first evaluation resultant output signal exceeds said first product and said idle channel condition when said first evaluation resultant output signal is less than said first product.

16. A method in accordance with claim 15 wherein said first preset constant multiplying factor is preset at about 1.5 to 8.

17. A method in accordance with claim 15 further comprising the steps of multiplying said second evaluation resultant output signal by a second preset constant multiplying factor for obtaining a second product, said second multiplying factor having a value less than unity, comparing said multiplied second evaluation resultant output signal with said first evaluation resultant output signal, and providing said active channel condition when either said first evaluation resultant output signal exceeds said first product or said first evaluation resultant output signal is less than said second product and said first idle channel condition when either said first evaluation resultant output signal is less than said first product or said first evaluation resultant output signal is greater than said second product.

18. A method in accordance with claim 17 wherein said second present constant multiplying factor is preset at about 0.125 to 0.667.

19. An improved method in accordance with claim 14 wherein the step of making said first evaluation comprises the step of integrating said voice channel signal over said first time domain, and the step of making said second evaluation comprises the step of integrating said voice channel signal over said second time domain.

20. A method in accordance with claim 14 further comprising the steps of making said first and second evaluations continuously over time for continuously detecting the presence or absence of said speech signal.

21. A method in accordance with claim 20 wherein the step of making said second evaluation comprises the step of delaying said first resultant output signal by a predetermined time period, said delayed first resultant output signal comprising said second resultant output signal, said second time domain conprising said first time domain delayed by said predetermined time period.

22. In a system for detecting the presence of a speech signal in a voice channel signal, said system providing an active channel indication when said speech signal presence is detected in said voice channel signal and an idle channel indication when the absence of said speech signal presence is detected in said voice channel signal, said voce channel signal being capable of containing both said speech signal and background noise, said speech signal having an envelope associated therewith having a magnitude variable over time, said background noise having an envelope associated therewith having a magnitude substantially constant over time, said voice channel signal having an envelope associated therewith having a magnitude dependent on said magnitudes of said speech signal and said background noise envelopes; said system having first evaluating means for receiving said voice channel signal and evaluating said voice channel signal envelope magnitude over a first time domain for providing a first evaluated output signal, means for providing a first preset threshold level output signal, said first level being preset at a level higher than said background noise envelope magnitude and first comparator means operatively connected to said first preset threshold level providing means and said first evaluating means outputs for comparing the level of said first evaluated output signal with said first preset threshold level and providing an output signal indicative thereof; the improvement comprising second evaluating means for making a second evaluation of said voice channel signal envelope magnitude over a second time domain for providing a second evaluated output signal, said second time domain being different from said first time domain; second comparator means operatively connected to said first and second evaluating means outputs for comparing said first and second evaluated output signals, determining the difference in magnitude between said first and second evaluated output signals, and comparing said difference with at least a first predetermined value for providing an output signal indicative thereof; and condition responsive logic means operatively connected to said first and second comparator means outputs and being responsive thereto for providing a first active channel condition when said first comparator means output signal is indicative of said first evaluated output signal level exceeding said first preset threshold level, a second active channel condition when said second comparator means output signal is indicative of said difference in magnitude between said first and second evaluated output signals exceeding said first predetermined value, and a third idle channel condition when both said first comparator means output signal is indicative of said first evaluated output signal being less than said first preset threshold level and said second comparator means output signal is indicative of said difference in magnitude between said first and second evaluated output signals being less than said first predetermined value, said active channel indication being provided when either said first or second active channel conditions are present, said idle channel indication only being provided when said third idle channel condition is present and neither said first or second active channel conditions is present.

23. A system in accordance with claim 22, wherein said first preset threshold providing means comprises means for providing a constant first preset threshold level.

24. A system in accordance with claim 22, wherein said first preset threshold providing means comprises means for providing a first preset threshold level of between $-30$ dBmO and $-40$ dBmO.

25. A system in accordance with claim 22, further comprising means for providing a second preset threshold level output signal, said second level being preset at a level less than said first level, and third comparator means operatively connected to said second preset threshold level providing means and said first evaluating means outputs for comparing the level of said first evaluated output signal with said second preset threshold level and providing an output signal indicative thereof, said condition responsive logic means being further operatively connected to said third comparator means output for providing a fourth idle channel condition when said third comparator means output signal is indicative of said first evaluation resultant output signal being less than said second level, said idle channel indication being provided when either said third or fourth idle channel conditions are present and neither said first nor second active channel conditions are present.

26. A system in accordance with claim 25, wherein said second preset threshold providing means comprises means for providing a constant second preset threshold level.

27. A system in accordance with claim 25, wherein said second preset threshold providing means comprises means for providing a second preset threshold level of between $-40$ dBmO and $-50$ dBmO.

28. A system in accordance with claim 22, wherein said first and second evaluating means each respectively comprise integration means for integrating said voice channel signal over said respective first and second time domains.

29. A system in accordance with claim 22, wherein said first and second evaluating means each comprise means for continuously evaluating said voice channel signal envelope magnitude over time for continuously detecting the presence or absence of said speech channel signal in said voice channel signal.

30. A system in accordance with claim 29, wherein said second evaluating means comprises means for delaying said first resultant output signal by a predetermined period, said delayed first resultant output signal comprising said second resultant output signal, said second time domain comprising said first time domain delayed by said predetermined time period.

31. A system in accordance with claim 22, wherein said second comparator means comprises first means for multiplying said second resultant output signal by a first preset constant multiplying factor for obtaining a first product output signal, said first multiplying factor having a value greater than unity, means operatively connected to said first multiplying means output and said first evaluating means output for comparing said first product output signal with said first resultant output signal for providing said indicative second comparator means output signal, said condition responsive logic means providing said second active channel condition when said second comparator means output signal is indicative of said first resultant output signal exceeding said first product output signal and said third idle channel condition when said second comparator means output signal is indicative of said first resultant output signal being less than said first product output signal.

32. A system in accordance with claim 31, wherein said first multiplying means comprises means for multiplying said second resultant output signal by said first preset constant multiplying factor having a value preset at about 1.5 to 8.

33. A system in accordance with claim 31, wherein said second comparator means further comprises second multiplying means operatively connected to said second evaluating means output for multiplying said second resultant output signal by a second preset constant multiplying factor for obtaining a second product output signal, said second multiplying factor having a value less than unity, and means operatively connected to said second multiplying means output and said first evaluating means output for comparing said second product output signal with said first resultant output signal for providing said indicative second comparator means output signal, said condition responsive logic means providing said second active channel condition when said second comparator means output signal is indicative of either said first resultant output signal exceeding said first product output signal or said first resultant output signal being less than said second product output signal and said third idle channel condition when said second comparator means output signal is indicative of either said first resultant output signal being less than said first product output signal or said first resultant output signal being greater than said second product output signal.

34. A system in accordance with claim 33, wherein said second multiplying means comprises means for multiplying said second resultant output signal by said second preset constant multiplying factor having a value preset at about 0.125 to 0.667.

* * * * *